United States Patent
Ativanichayaphong et al.

(10) Patent No.: US 7,032,169 B2
(45) Date of Patent: Apr. 18, 2006

(54) METHOD AND SYSTEM FOR DISTRIBUTED COORDINATION OF MULTIPLE MODALITIES OF COMPUTER-USER INTERACTION

(75) Inventors: Soonthorn Ativanichayaphong, Deerfield Beach, FL (US); Charles W. Cross, Wellington, FL (US); Gerald M. McCobb, Delray Beach, FL (US); Nicolae D. Metianu, Lake Worth, FL (US); Leslie R. Wilson, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/153,073

(22) Filed: May 22, 2002

(65) Prior Publication Data

US 2003/0221158 A1    Nov. 27, 2003

(51) Int. Cl.
  *G06F 15/00* (2006.01)
(52) U.S. Cl. ............... 715/501.1; 715/513; 715/738; 704/275
(58) Field of Classification Search ............. 715/501.1, 715/513, 530, 522, 500, 738; 704/270, 275
See application file for complete search history.

(56) References Cited

U.S. PATENT DOCUMENTS

| | | | |
|---|---|---|---|
| 5,781,909 A * | 7/1998 | Logan et al. ............... 707/200 |
| 6,349,132 B1 * | 2/2002 | Wesemann et al. ...... 379/88.17 |
| 6,594,348 B1 * | 7/2003 | Bjurstrom et al. ........ 379/88.13 |
| 2002/0069223 A1 * | 6/2002 | Goodisman et al. ......... 707/513 |
| 2003/0156152 A1 * | 8/2003 | Ray et al. ...................... 347/25 |
| 2003/0182622 A1 * | 9/2003 | Sibal et al. .................. 715/511 |
| 2003/0187656 A1 * | 10/2003 | Goose et al. ............ 704/270.1 |
| 2004/0006474 A1 * | 1/2004 | Gong et al. .............. 704/270.1 |

OTHER PUBLICATIONS

U.S. Appl. No. 60/357,924.*
U.S. Appl. No. 09/605,612, filed Jun. 28, 2000, Lucas et al.
K. A. Hamberg, et al., *GUI Navigation In Embedded Automotive Systems*, TradeSpeak.Com, <http://www.tradespeak.com/htmldocs/2030.html>, (Jun. 26, 2000).
L. Boyer, et al., *Voice eXtensible Markup Language (VoiceXML™) Version 1.0*, <http://www.w3.org/TR/voicexml/>, (Aug. 28, 2002).

* cited by examiner

*Primary Examiner*—William Bashore
*Assistant Examiner*—Thu V. Huynh
(74) *Attorney, Agent, or Firm*—Akerman Senterfitt

(57) ABSTRACT

A method of coordinating the presentation of multiple modes of interaction for network-based electronic content can include receiving a markup language document of a first modality and identifying within the markup language document a reference to another markup language document of a second and different modality. The markup language document of the first modality can be modified by removing the reference. The modified markup language document of the first modality can be provided to an associated browser.

22 Claims, 4 Drawing Sheets

METHOD AND SYSTEM FOR DISTRIBUTED COORDINATION OF MULTIPLE MODALITIES OF COMPUTER-USER INTERACTION

BACKGROUND OF THE INVENTION

1. Technical Field

This invention relates to browsing network-based electronic content and more particularly to a method and apparatus for coordinating the operation of a visual browser and a voice browser.

2. Description of the Related Art

Visual browsers are applications which facilitate visual access to network-based electronic content provided in a computer communications network. For example, one type of visual browser, the Web browser, is useful for locating and displaying network-based electronic content formatted using HyperText Markup Language ("HTML"). The term "visual browser" denotes that the browser can display graphics, text or a combination of graphics and text. In addition, most visual browsers can present multimedia information, including sound and video, although some visual browsers can require plug-ins in order to support particular multimedia information formats.

Unlike a visual browser, a voice browser typically operates in conjunction with a speech recognition engine and speech synthesis engine and permits the user to interact with network-based electronic content audibly. That is, the user can provide voice commands to navigate from network-based electronic document to document. Likewise, network-based electronic content can be presented to the user audibly, typically in the form of synthesized speech. Thus, voice browsers can provide voice access and interactive voice response to network-based electronic content and applications, for instance by telephone, personal digital assistant, or desktop computer.

Voice browsers can be configured to interact with network-based electronic content encoded in Voice Extensible Markup Language (VoiceXML). VoiceXML is a markup language for distributed voice applications and is designed for creating audio dialogs that feature synthesized speech, digitized audio, recognition of spoken and Dual Tone Multifrequency ("DTMF") key input, recording of spoken input, telephony, and mixed-initiative conversations.

In an effort to provide users with the ability to interact with network-based visual content in a visual browser while also interacting with network-based audio content in a voice browser, some have proposed and developed multi-modal languages. The W3C, for example, has proposed a single authoring language known as DialogML which includes much of the capability provided by both visual and voice markup languages. Although multi-modal languages integrate the capabilities of both visual and voice browsers, in order to benefit from multi-modal languages, presently available applications written for single modal operation first must be completely rewritten in a multi-modal language.

Another proposed solution for integrating the functionality of a voice browser and a visual browser has been to code speech synthesis functionality into an existing visual browser to produce a speech-aware visual browser. Similarly, new speech-related markup tags for visual browsers have been proposed in order to provide speech functionality to a visual browser. Still, this solution requires the development of a speech-aware function set for handling network-based speech content and the integration of the same directly in the source code of the visual browser. In consequence, the development of speech-related functionality is tightly linked to the development of the remaining functionality of the visual browser. The tight integration between the visual browser and the speech-aware functionality precludes the user from using a separate, more robust, and efficient voice browser having a set of functions useful for interacting with network-based speech content.

Another proposed solution has been to provide multi-modal functionality by coupling the operation of a visual browser and a voice browser such that a user of both can interact with network-based electronic content concurrently. The browsers can be coupled by defining new attributes for tags in both the voice markup language and the visual markup language. This solution allows developers to develop applications for a browser of choice for both visual and voice-based applications. Although this solution enables presently available single modal applications to be transformed for use with such a coupling mechanism with less effort than completely recoding an application, this solution requires that both the visual browser and the voice browser be reprogrammed and reconfigured to interpret the new tag structures.

SUMMARY OF THE INVENTION

The invention disclosed herein provides a method and apparatus for concurrently accessing network-based electronic content in a voice browser and a visual browser. In particular, one or more references can be added to a visual markup language and a voice markup language. These references can be interpreted by the present invention to coordinate the operation of both browsers. The references can be removed from markup language documents, however, prior to forwarding the markup language documents to their respective browsers so as to avoid the necessity of each browser being reconfigured to process the newly defined references.

Another aspect of the invention can include a method of initializing a browser coordinator for coordinating the presentation of multiple modes of interaction for network-based electronic content. The method can include providing a request for a markup language document from a browser of a first modality to a network application and subsequently receiving the markup language document. The markup language document can include a reference to a second markup language document of a second and different modality. The reference can be identified within the markup language document. Notably, the markup language document can be modified by removing at least part of the reference to the second markup language document before forwarding the modified markup language document to the browser of the first modality. A synchronization table can be created which includes at least the reference to the second markup language document stored therein. Alternatively, a synchronization table can be updated to include at least the reference.

One aspect of the present invention can include a method of coordinating the presentation of multiple modes of interaction for network-based electronic content. The method can include receiving a markup language document of a first modality and identifying within the markup language document a reference to another markup language document of a second and different modality. The markup language document of the first modality can be modified by removing at least part of the reference before providing the modified markup language document to an associated browser.

Another aspect of the present invention can include a method of coordinating the presentation of multiple modes of interaction for network-based electronic content. The method can include receiving a request for a first markup language document from a browser of a first modality and determining from a synchronization table a reference to a second markup language document associated with the first markup language document. The second markup language document can be associated with a browser of a second and different modality.

The request for the first markup language document can be provided to a network application and the requested first markup language document subsequently can be received. The first markup language document then can be modified by removing at least part of the reference to the second markup language document. The modified first markup language document then can be provided to the browser of the first modality. The synchronization table associated with the browser of the first modality can be updated according to the reference to the second markup language document. Notably, the updating step can include creating a new synchronization table including at least the reference to the second markup language document and deleting the previous synchronization table associated with the browser of the first modality.

The method further can include providing the reference to the second markup language document to the browser of the second modality and receiving a request for the second markup language document from the browser of the second modality. The reference to the second markup language document can be provided to a network application. The second markup language document subsequently can be received. Notably, the second markup language document can include a second reference to another markup language document of the first modality. The second markup language document can be modified by removing at least a part of the second reference. The modified second markup language document then can be provided to the browser of the second modality.

A second synchronization table associated with the browser of the second modality can be updated according to the second reference. In one embodiment, a new synchronization table can be created to include at least the second reference and the previous synchronization table associated with the browser of the second modality can be deleted.

Another aspect of the present invention can include a browser coordinator configured to receive requests for markup language documents from at least two browsers of differing modalities; to forward the requests to a network application; to receive the requested markup language documents having coordination tags contained therein; and to modify the received markup language documents by removing at least a portion of each coordination tag from the received markup language documents. The browser coordinator further can be configured to maintain a visual synchronization table and a voice synchronization table, and to provide each modified markup language document to an associated browser.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and apparatus for concurrently accessing network-based electronic content in a voice browser and a visual browser. In particular, one or more attributes and coattributes can be added to a visual markup language and a voice markup language which can be interpreted by the present invention to coordinate the operation of both browsers. The present invention can serve as a conduit through which markup language document requests from the voice browser and the visual browser can be directed. Additionally, received markup language documents can be routed through the present invention. Notably, the present invention can interpret the additional attributes and coattributes from received markup language documents, remove the coattributes as necessary, and route the resulting markup language document to the appropriate browser. In consequence, the local voice browser and visual browser need not be configured to support the newly defined attributes and coattributes.

The present invention can coordinate the operation of a visual browser and a voice browser by identifying within retrieved markup language documents of a first modality a reference to a markup language document of a second modality. Specifically, a visual markup language document can include a reference to a voice markup language document which is to be presented concurrently with the visual markup language document by a complementary browser. Similarly, a voice markup language document can include a reference to a visual markup language document which is to be presented concurrently with the voice markup language document by a complementary browser. In both cases, existing tags defined by existing markup languages can be modified to include the aforementioned references. The present invention can interpret the references and process received markup language documents to remove the references. Accordingly, when the resulting visual and voice markup language documents are provided to their respective browsers, the browsers need not be configured to interpret the modified tags.

Figure 1:
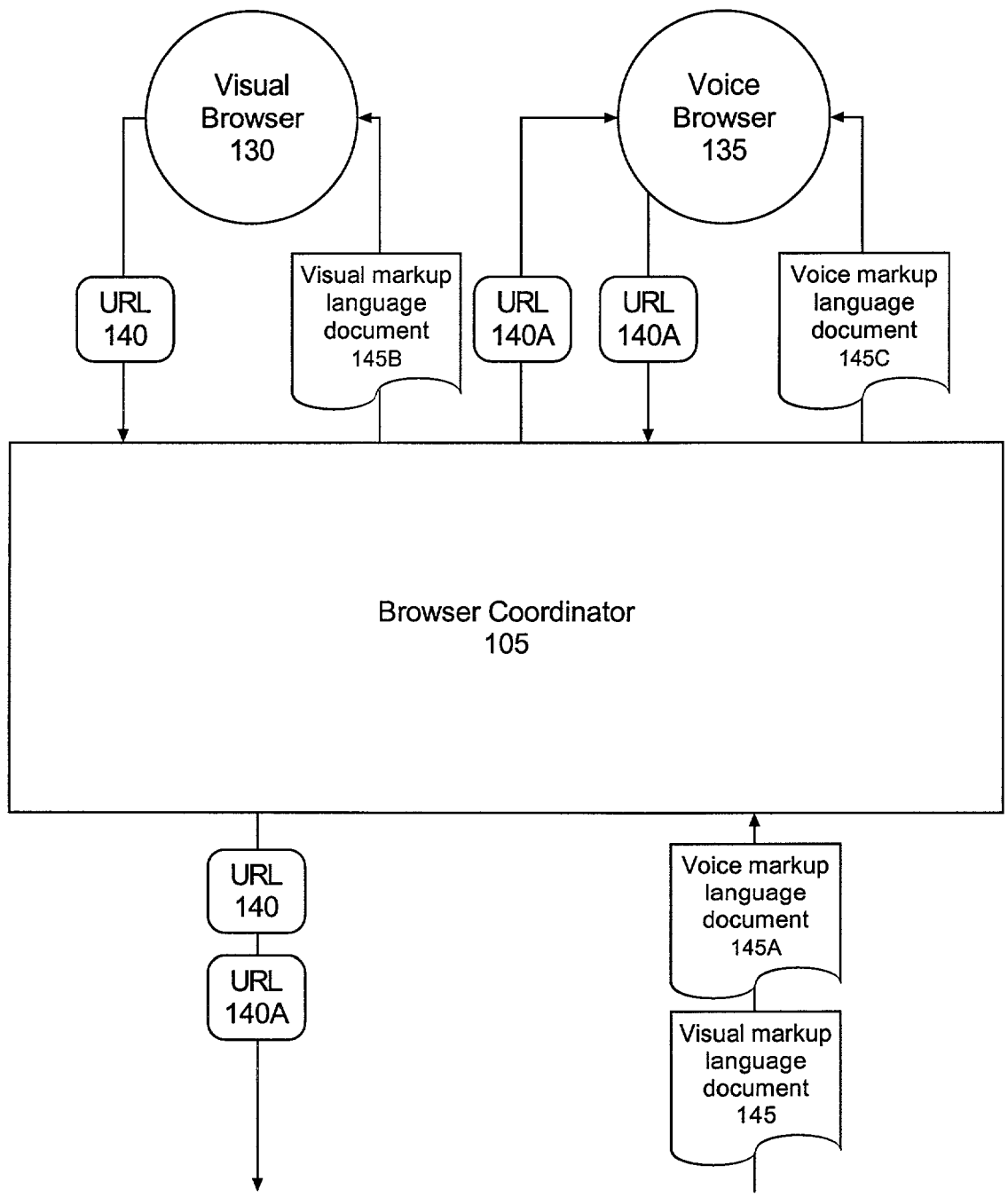
FIG. 1 is a schematic diagram illustrating a system for coordinating the presentation of multi-modal electronic content.

FIG. 1 is a schematic diagram illustrating a system 100 for coordinating the presentation of multi-modal electronic content. As shown in FIG. 1, system 100 can include a browser coordinator 105 for coordinating the operation of a visual browser 130 and a voice browser 135. The visual browser 130, as is well known in the art, can process and display electronic content formatted for visual presentation. For example, the visual browser 130 can process electronic content formatted with a visual markup language such as Hypertext Markup Language (HTML). The voice browser 135 can process electronic content formatted for audible presentation. Thus, the voice browser 135 can process electronic content formatted using an audio-based formatting language such as voice extensible markup language (VoiceXML).

Each of the browsers 130 and 135 can be configured to receive server-push events. Push technology, as is known in the art, refers to the delivery of information on the Web that is initiated by an information server rather than the information user or client. Accordingly, the visual browser 130 and the voice browser 135 can be configured to receive information from the browser coordinator 105 at the initiation of the browser coordinator 105. Additionally, the present invention is not limited by the particular method of formatting electronic content. Rather, any suitable method for formatting visual electronic content and audible electronic content can suffice. Examples of suitable alternative visual formatting methods can include C-HTML, XML, SGML, VRML, and the like. Similarly, examples of suitable alternative audible presentation methods can include WAV, MPEG, AIFF, and the like.

The browser coordinator 105 can be remotely located from each of the browsers 130 and 135 and can be communicatively linked to each of the browsers through a computer communications network. The browser coordinator 105 can serve as an interface or proxy for the browsers 130 and 135. Accordingly, requests for markup language documents from either visual browser 130 or voice browser 135 can be received by the browser coordinator 105, processed, and then forwarded to a suitable network application elsewhere within the computer communications network. The markup language documents requested by each of the browsers 130 and 135 can be received by the browser coordinator, processed, and then forwarded to the intended recipient browser corresponding to each received markup language document.

In operation, the browser coordinator 105 can receive a document request specifying URL 140 from the visual browser 130. URL 140 can correspond to a visual markup language document located within the computer communications network. The browser coordinator 105 can process the received document request and determine whether URL 140 is associated with another URL corresponding to a voice markup language document which is intended to be presented concurrently with the visual markup language document. Accordingly, within an internal reference table, the browser coordinator can locate URL 140A which references the voice markup language document associated with the visual markup language referenced by URL 140.

The browser coordinator 105 can provide the document request specifying URL 140 to an appropriate network application. Additionally, the browser coordinator 105 can provide the URL 140A to the voice browser 135, for example using push technology as previously described. Accordingly, the voice browser 135 can request the voice markup language document referenced by URL 140A. The browser coordinator 105 can receive the document request specifying URL 140A, process the request, and forward the request to a network application.

The browser coordinator 105 then can receive the markup language documents requested and referenced by URLs 140 and 140A. As shown in FIG. 1, the browser coordinator 105 can receive a visual markup language document 145 corresponding to URL 140 and a voice markup language document 145A corresponding to URL 140A. The browser coordinator 105 can process each of the received markup language documents and provide each document to the appropriate browser. Specifically, visual markup language document 145 can be processed and the resulting visual markup language document 145B can be provided to the visual browser 130. The voice markup language document 145A can be processed and the resulting voice markup language document 145C can be provided to the voice browser 135.

Although FIG. 1 depicts the situation in which a request was initially provided by the visual browser 130, it should be appreciated that the voice browser 135 also can initiate the first request for a markup language document. In that case, the browser coordinator 105 can receive the request for a voice markup language document, identify a corresponding visual markup language document, and provide the URL of the visual markup language document to the visual browser 130 similar to the manner previously described.

Figure 2:
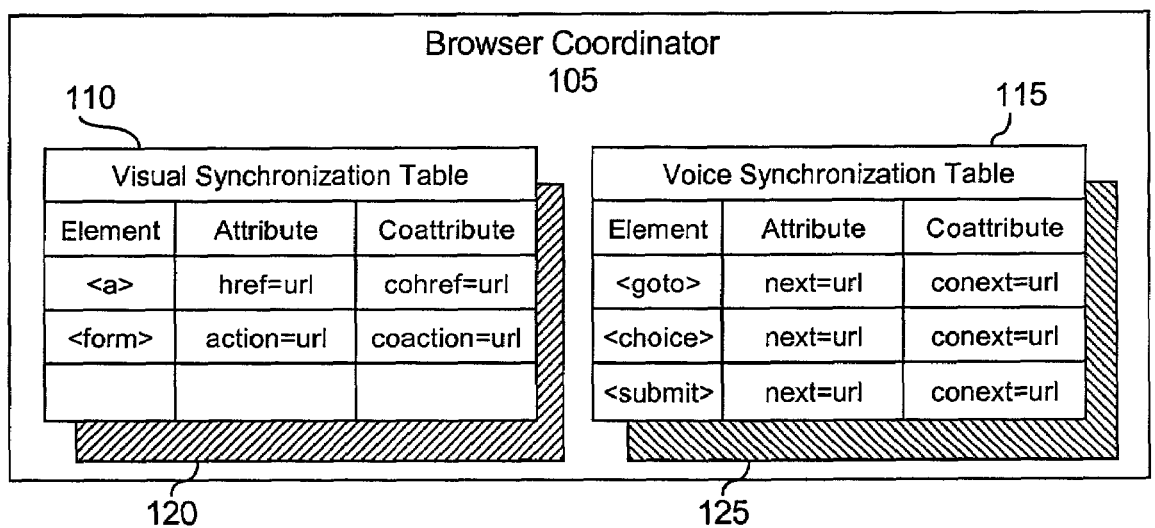
FIG. 2 is a schematic diagram illustrating another aspect of the system of FIG. 1.

FIG. 2 is a schematic diagram illustrating the processing performed by the browser coordinator 105 of FIG. 1. The browser coordinator 105 includes two active synchronization tables 110 and 115. The synchronization tables can store references identified within received markup language documents for coordinating the operation of the visual browser and the voice browser. In particular, the synchronization tables 110 and 115 can include attributes and coattributes extracted from modified markup language tags included within received markup language documents.

For example, upon receiving a visual markup language document, the browser coordinator 105 can identify particular tags within the document, extract the attribute and coattribute from each of the tags, and populate the visual synchronization table 110. Thus, when a user selects a particular URL for a visual markup language document listed in the visual synchronization table 110, a complementary URL ("co-URL") can be identified in the visual synchronization table 110 which corresponds to a voice markup language document which is to be presented with the selected visual markup language document. Similarly, the browser coordinator 105 can identify particular tags within a received voice markup language document, extract the attribute and coattribute within each of the tags, and populate the voice synchronization table 115.

As new markup language pages are received, the browser coordinator can continue to identify modified tags, extract attributes and coattributes, and update the appropriate synchronization table. In one embodiment of the present invention, the browser coordinator 105 can create a new table for each received markup language document. Thus, upon receiving a new visual markup language document, the browser coordinator can extract attributes and coattributes and create a new visual synchronization table 120 having the attributes and coattributes stored therein. The browser coordinator 105 can delete the previous visual synchronization table 110. In similar fashion, the browser coordinator 105 can create a new voice synchronization table 125 corresponding to newly received voice markup language documents, populate the voice synchronization table 125, and delete the previous voice synchronization table 115.

In illustration, when the user selects a link in the visual browser 130, the visual browser 130 visits the URL of the visual page specified by the link. To direct the voice browser 135 to visit the corresponding voice page, an application developer can add a covisit attribute containing the URL of the desired voice page to the HTML anchor or form tag in the visual page. Similarly, when the user selects a link in the voice browser 135, the voice browser visits the URL of the voice page specified by the link. To direct the visual browser 120 to visit the corresponding visual page, the application developer can add a comenu, coform, or conext attribute containing the URL of the desired visual page to the VoiceXML tag in the voice page.

Thus each browsing component (voice and visual) can interpret its own markup stream and make its own transition from one document or document element (URL) to another document or document element. The document elements contain markup attributes that synchronize the transitions of each browser to the other, at points chosen by the application designer.

Coordination markup attributes, for example cohref and conext tags, can be used by the browser coordinator 105 to effectively synchronize a visual browser and a voice browser without requiring the wholesale modification of either. As an example, when a user mouse-clicks on a visual display of a map in a visual browser, a co-target tag associated with the map can indicate to a voice browser to load and playback audio content associated with the map. Conversely, a voice browser can prompt a user to speak the name of a geographic location for which the voice browser can audibly provide further information. In response to receiving speech input specifying a geographic location, a co-target tag associated with the voice prompt can indicate to a visual browser to load and display a map showing the location of the specified geographic location.

In particular, HTML formatted content and VoiceXML formatted content can include "co-target" type tags designed to reference other browsers. Specifically, in an HTML formatted document, an anchor reference markup tag containing an "href" can be used to specify target Web content to be loaded when a user selects the anchor reference. Typically, the target Web content is specified by a uniform resource locator ("URL") specified in the href. A co-target specifying VoiceXML content, known as a "cohref", can be embedded in the anchor reference in addition to the target Web content. An example of a co-target specified by a cohref follows:

can request, through the browser coordinator 105, the VoiceXML document "mainmenu.vxml".

Correspondingly, in a VoiceXML formatted document, a "choice next" markup tag can be used to specify target VoiceXML content to be loaded when a user vocally selects a particular choice in the VoiceXML document. Typically, the target VoiceXML content is specified by a uniform resource locator ("URL") specified in the choice next tag. In the preferred embodiment, a "conext" coattribute specifying Web content can be embedded in the choice next tag in addition to the target VoiceXML content. An example of a choice next tag incorporating a conext coattribute follows:

```
<vxml version="1.0">
    <form name="Welcome">
        <block>Welcome to the CoBrowsing Demo!
            <goto next="#1"/>
        </block>
    </form>
    <menu id="1">
        <prompt>Say test to authenticate user.</prompt>
        <grammar type="text/jsgf">
            continue
        </grammar>
        <choice next="mainmenu.vxml" conext="mainmenu.html">
            test
        </choice>
    </menu>
</vxml>
```

As shown in the above example, the hyperlink specified by the next tag includes a reference both to a target VoiceXML document specified by "mainmenu.vxml" and a co-target Web page specified by "mainmenu.html". When the browser coordinator 105 encounters the "choice next"

```
<HTML>
    <HEAD>
        <TITLE>SBU CoBrowsing Demo</TITLE>
    </HEAD>
    <BODY LEFTMARGIN="0" TOPMARGIN="0">
        <A HREF="mainmenu.html" cohref="mainmenu.vxml">
        <IMG SRC="splashscreen.jpg" WIDTH="314" HEIGHT="200"/> </A>
    </BODY>
</HTML>
```

As shown in the above example, the hyperlink specified by the anchor markup includes a reference both to a target Web page specified by "mainmenu.html" and a co-target VoiceXML document specified by "mainmenu.vxml". When the browser coordinator 105 encounters this tag in a received visual markup language document, the browser coordinator 105 can store the attribute "HREF=mainmenu.html" and the coattribute "cohref=mainmenu.vxml" within the visual synchronization table 110, remove the coattribute from the received markup language document, and then provide the resulting markup language document to the visual browser. Thus, the visual browser need not be configured to interpret the modified visual markup language tag.

Subsequently, when a user selects the hyperlink associated with "mainmenu.html", the browser coordinator 105 can receive the request and locate the co-target reference "mainmenu.vxml" within the visual synchronization table 110. The browser coordinator 105 can provide the coattribute to the voice browser. In response, the voice browser tag in a received voice markup language document, the browser coordinator 105 stores the attribute "mainmenu.vxml" and the coattribute "mainmenu.html" within the voice synchronization table 115, removes the coattribute from the "choice next" tag, and then provides the resulting voice markup language document to the voice browser.

Subsequently, when a user selects a choice associated with the "mainmenu.vxml" attribute, the browser coordinator 105 can receive the request and locate the coattribute "mainmenu.html" within the voice synchronization table 115. The browser coordinator 105 can provide the coattribute to the visual browser. In response, the visual browser can request, through the browser coordinator 105, the HTML document "mainmenu.html".

A number of coordination tags can be defined for coordinating the actions of the visual browser with the actions of the voice browser. The following table presents an exemplary list of coordination tags for use with the browser coordinator 105 of the present invention:

| | |
|---|---|
| Visual Browser | <a href=URL cohref=URL> |
| | <form action=URL coaction=URL> |
| Voice Browser | <choice next=URL conext=URL> |
| | <goto next=URL conext=URL> |
| | <link next=URL conext=URL> |
| | <submit next=URL conext=URL> |

With regard to the voice browser, "conext" specifies the URL for the visual browser display when an associated voice-specified goto or menu choice is selected by a user. With regard to the visual browser, "cohref" specifies the URL for the voice browser to visit when an associated visual link or button is selected; and, "coaction" specifies the URL for the voice browser to visit when an associated visual form is submitted.

Figure 3:
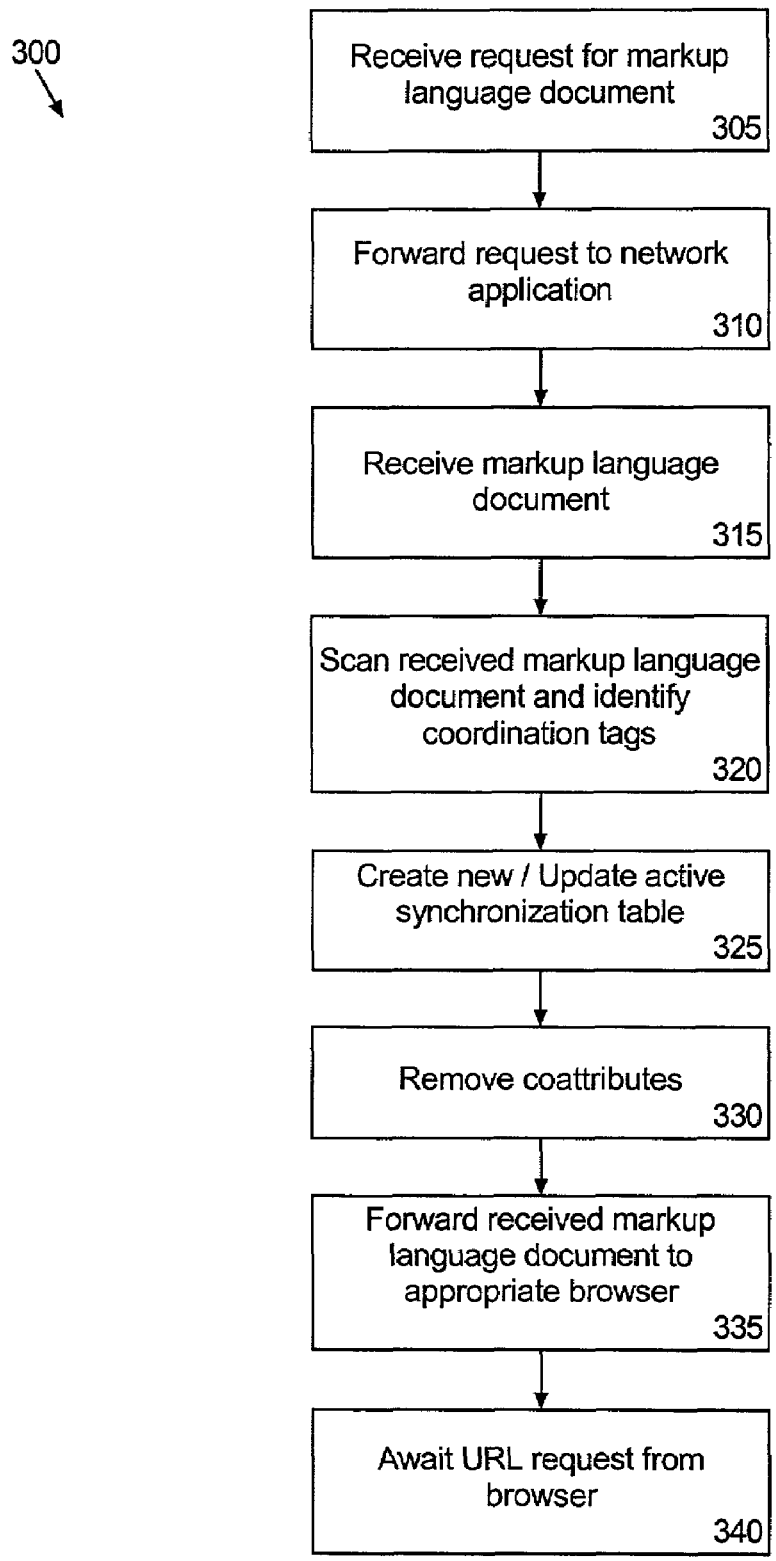
FIG. 3 is a flow chart illustrating a method of initializing the system disclosed herein.

FIG. 3 is a flow chart illustrating a method 300 of initializing the browser coordinator 105 of FIG. 2. Although the description of FIG. 3 is with reference to a visual browser initiating the method, those skilled in the art will recognize that method 300 can be performed with the voice browser initiating the process as well. In any case, method 300 can begin in a state wherein the browser coordinator has not received any requests for markup language documents from either the visual browser or the voice browser. Thus, the synchronization tables have not yet been updated, or alternatively, no synchronization tables have been created.

In step 305, the browser coordinator can receive a request for a visual markup language document from the visual browser. In step 310, the browser coordinator can forward the request to the appropriate network application or Web application as the case may be. The visual markup language document corresponding to the request can be received in step 315.

In step 320, the browser coordinator can scan the received visual markup language document. Specifically, the browser coordinator can identify any coordination tags along with the attributes and coattributes of the coordination tags which are contained within the received visual markup language document. In step 325, the browser coordinator can create a visual synchronization table with the identified attributes and coattributes of the coordination tags. Alternatively, as mentioned, the browser coordinator can update a previous version of the visual synchronization table to include the attributes and coattributes identified in the received visual markup language document. In step 330, the browser coordinator can remove the coattributes from the received visual markup language document. In step 335, the browser coordinator can forward the resulting visual markup language document to the visual browser and await a subsequent URL request from the visual browser in step 340. A similar process wherein the requesting browser is the voice browser can be performed to initialize a voice synchronization table.

Figure 4:
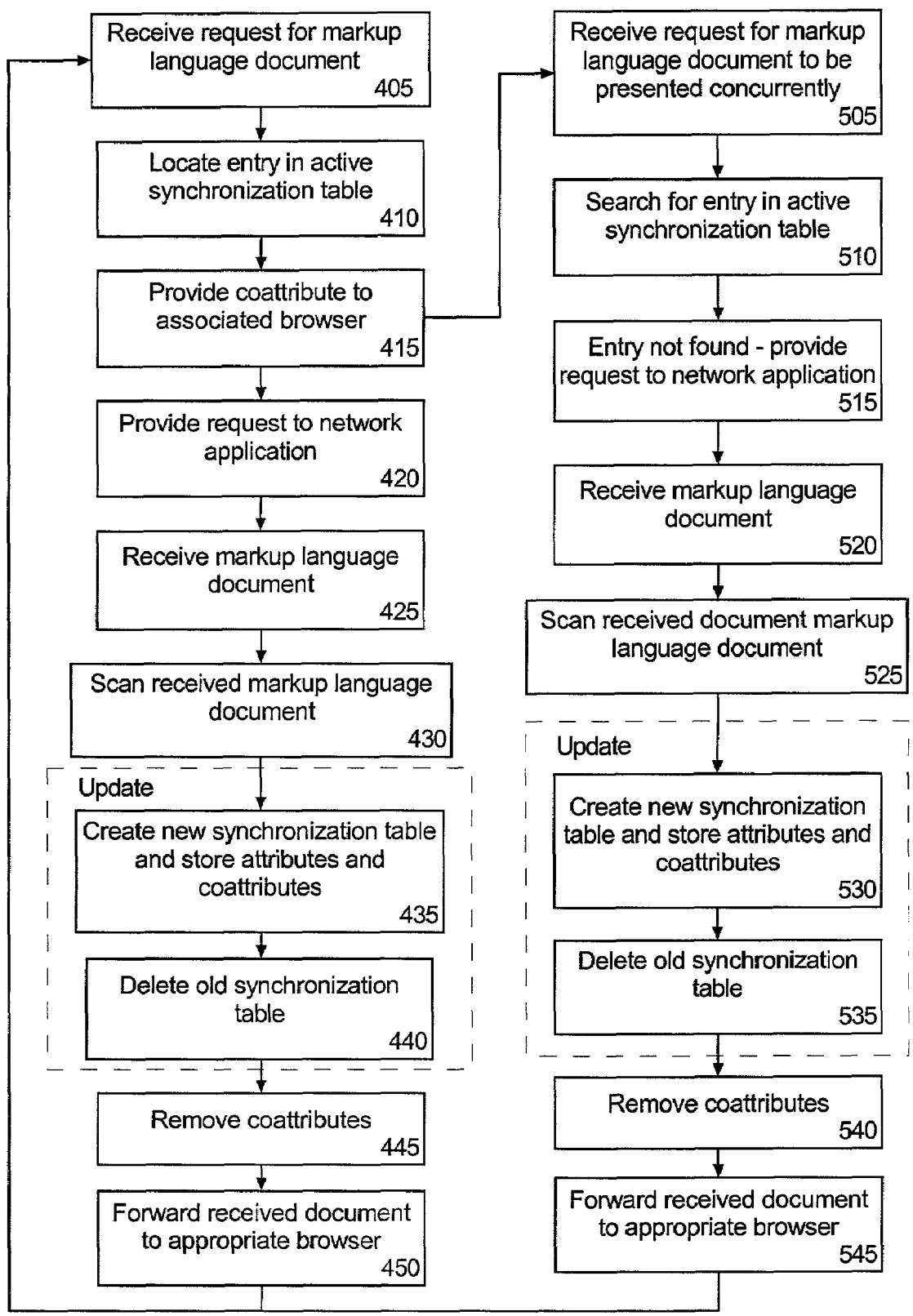
FIG. 4 is a flow chart illustrating a method of coordinating browsers for presenting multi-modal electronic content.

FIG. 4 is a flow chart illustrating a method 400 of coordinating browsers for presenting multi-modal electronic content. Method 400 can begin in a state wherein the browser coordinator has been initialized. In other words, a visual markup language document and a voice markup language have been received, each including coordination tags such that a visual synchronization table and a voice synchronization table have been created or updated. Thus, for user selections wherein multi-modal content is to be presented, whether the selection is responsive to the latest visual or voice markup language document, the synchronization tables can include corresponding attributes and coattributes identifying markup language documents of different modalities which are to be presented concurrently with one another.

Additionally, although the description of method 400 is with reference to a visual browser initiating the method, those skilled in the art will recognize that method 400 can be performed with the voice browser initiating the process as well. Accordingly, the invention is not limited to one browser or the other initiating the methods disclosed herein. Accordingly, method 400 can begin in step 405 where the browser coordinator can receive a request for a visual markup language document from the visual browser. In step 410, the browser coordinator can identify the address or URL of the requested visual markup language document and locate an entry within the visual synchronization table which is associated with that address. The entry can include a coattribute, for example a co-URL which corresponds to a voice markup language document to be presented concurrently, or substantially concurrently with the visual markup language document corresponding to the received request. In step 415, the coattribute can be provided to the voice browser. The method 400 can continue from step 415 to step 420. Notably, as the method continues through to step 450, the method simultaneously can proceed from step 505 through step 545.

Proceeding with step 420, the received visual markup language document request can be provided to the appropriate network application. Subsequently, in step 425, the browser coordinator can receive the requested visual markup language document. In step 430, the received visual markup language document can be scanned for coordination tags. The attributes and coattributes within the coordination tags can be identified, and in step 435, the browser coordinator can create a new visual synchronization table with the identified attributes and coattributes stored therein. Alternatively, a previous synchronization table can be updated or overwritten rather than creating a new table and deleting the old table. In step 440, if the browser coordinator created a new visual synchronization table, the previous visual synchronization table can be deleted. In step 445, the browser coordinator can remove the coattributes from the received visual markup language document. The resulting visual markup language document then can be provided to the visual browser in step 450.

As mentioned, after the coattribute, in this case the co-URL, is provided to the voice browser in step 415, the method also can proceed to step 505, where the browser coordinator receives from the voice browser a request for the voice markup language document associated with the co-URL. In step 510, the browser coordinator can access the active voice synchronization table to determine whether a match exists for the address of the requested voice markup language document. Because the voice markup language document is being requested in response to a requested visual markup language document, the active voice synchronization table will not contain a match. Accordingly, the browser coordinator, in step 515, can provide the request for the voice markup language document to an appropriate network application.

In step 520, the browser coordinator can receive the requested voice markup language document. In step 525, the browser coordinator can scan the received voice markup language document to identify any coordination tags having attributes and coattributes within the voice markup language document. In step 530, the identified attributes and coattributes can be stored within a new voice synchronization table. As was the case with the visual synchronization table, the browser coordinator can update or overwrite an existing voice synchronization table with the attributes and coattributes extracted from the received voice markup language document. Regardless, in step 535, if the browser coordinator created a new voice synchronization table, the previous voice synchronization table can be deleted.

In step 540, the coattributes can be removed from the voice markup language document, and in step 545, the resulting voice markup language document can be provided to the voice browser. After completion of step 450 and 545, the method can proceed to step 405 to begin anew. Specifically, the method can await for a subsequent request for a visual or voice markup language document.

In this manner, the present invention provides for the concurrent presentation of multi-modal electronic content by coordinating the operation of a voice browser and a visual browser without requiring either browser to recognize newly defined coordination tags.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of coordinating the presentation of multiple modes of interaction for network-based electronic content comprising:
receiving a markup language document of a first modality in a browser coordinator communicatively linked to a browser and a complementary browser, said browser configured to process said markup language document of said first modality and said complementary browser configured to process markup language documents of a second modality, which is different from the first modality;
using said browser coordinator to identify within said received markup language document of the first modality a reference to a markup language document of the second modality;
retrieving with said browser coordinator said markup language document of the second modality from a location identified by said browser coordinator based on said reference;
modifying with said browser coordinator said markup language document of the first modality by removing at least part of said reference;
conveying from said browser coordinator said modified markup language document of the first modality to said browser; and
conveying from said browser coordinator said markup language document of the second modality to said complementary browser.

2. A method of initializing a browser coordinator for coordinating the presentation of multiple modes of interaction for network-based electronic content, said method comprising:
providing to said browser coordinator a request for a markup language document from a browser of a first modality to a network application;
receiving with said browser coordinator said markup language document, wherein said markup language document includes a reference to another markup language document of a second modality, which is different from the first modality;
identifying with said browser coordinator said reference within said markup language document;
retrieving said other markup language document of the second modality from a location identified by said browser coordinator based upon the reference;
modifying said markup language document by removing at least part of said reference;
providing said modified markup language document to said browser of the first modality; and
providing said other markup language document to a complementary browser for rendering said other markup language document in coordination with a rendering of said modified markup language document by said browser of the first modality.

3. The method of claim 2, further comprising:
creating a synchronization table having at least said reference stored therein.

4. The method of claim 2, further comprising:
updating a synchronization table to include at least said reference stored therein.

5. A method of coordinating the presentation of multiple modes of interaction for network-based electronic content comprising:
receiving a request for a first markup language document from a browser of a first modality, the request being received in a browser coordinator communicatively linked to said browser and to a complementary browser, said browser configured to process said markup language document of said first modality and said complementary browser configured to process markup language documents of a second modality, which is different from the first modality;
determining from a synchronization table contained in said browser coordinator a reference to a second markup language document of the second modality associated with said first markup language document, wherein said second markup language document is associated with a said complementary browser;
providing said request for said first markup language document to a network application and receiving said first markup language document in said browser coordinator;
modifying said first markup language document by said browser coordinator by removing at least part of said reference to said second markup language document;

providing said modified first markup language document from said browser coordinator to said browser of the first modality; and providing said second markup language document from said browser coordinator to said complementary browser.

6. The method of claim 5, further comprising:

updating said synchronization table associated with said browser of the first modality according to said reference to said second markup language document.

7. The method of claim 6, wherein said updating step further comprises:

creating a new synchronization table including said reference to said second markup language document; and deleting said synchronization table.

8. The method of claim 5, further comprising:

providing said reference to said second markup language document to said browser of the second modality;

receiving a request for said second markup language document from said browser of the second modality;

providing said reference to said second markup language document to a network application;

receiving said second markup language document, wherein said second markup language document includes a second reference to another markup language document of the first modality; and modifying said second markup language document by removing at least part of said second reference.

9. The method of claim 8, further comprising:

updating a second synchronization table associated with said browser of the second modality according to said second reference.

10. The method of claim 9, wherein said updating step comprises:

creating a new second synchronization table including said second reference; and deleting said second synchronization table.

11. A browser coordinator configured to receive requests for markup language documents from at least two browsers of differing modalities, to identify within a received markup language document of a first modality a reference to a markup language document of a second modality, which is different from the first modality, to retrieve said markup language document of the second modality from a location identified by said reference, to modify said markup language document of the first modality by removing at least part of said reference, to convey said modified markup language document of the first modality to browser of the first modality, and convey said markup language document of the second modality to a browser of the second modality.

12. The browser coordinator of claim 11, configured to maintain a visual synchronization table and a voice synchronization table, and to provide each said modified markup language document to an associated browser.

13. A machine-readable storage, having stored thereon a computer program having a plurality of code sections executable by a machine for causing the machine to perform the steps of:

receiving a markup language document of a first modality in a browser coordinator communicatively linked to a browser and complementary browser, said browser configured to process said markup language document of said first modality and said complementary browser configured to process markup language documents of a second modality, which is different from the first modality;

using said browser coordinator to identify within said received markup language document of the first modality a reference to a markup language document of the second modality;

retrieving with said browser coordinator said markup language document of the second modality from a location identified by said browser coordinator based on said reference;

modifying with said browser coordinator said markup language document of the first modality by removing at least part of said reference;

conveying from said browser coordinator said modified markup language document of the first modality to said browser; and conveying from said browser coordinator said markup language document of the second modality to said complementary browser.

14. A machine-readable storage, having stored thereon a computer program having a plurality of code sections executable by a machine for causing the machine to perform the steps of:

providing to said browser coordinator a request for a markup language document from a browser of a first modality to a network application;

receiving with said browser coordinator said markup language document, wherein said markup language document includes a reference to another markup language document of a second modality, which is different from the first modality;

identifying with said browser coordinator said reference within said markup language document;

retrieving said other markup language document of the second modality from a location identified by said browser coordinator based upon the reference;

modifying said markup language document by removing at least part of said reference;

providing said modified markup language document to said browser of the first modality; and providing said other markup language document to a complementary browser for rendering said other markup language document in coordination with a rendering of said modified markup language document by said browser of the first modality.

15. The machine-readable storage of claim 14, further comprising:

creating a synchronization table having at least said reference stored therein.

16. The machine-readable storage of claim 14, further comprising:

updating a synchronization table to include at least said reference stored therein.

17. A machine-readable storage, having stored thereon a computer program having a plurality of code sections executable by a machine for causing the machine to perform the steps of:

receiving a request for a first markup language document from a browser of a first modality, the request being received in a browser coordinator communicatively linked to said browser and to a complementary browser, said browser configured to process said markup language document of said first modality and said complementary browser configured to process markup language documents of a second modality, which is different from the first modality;

determining from a synchronization table contained in said browser coordinator a reference to a second markup language document of the second modality associated with said first markup language document, wherein said second markup language document is associated with a said complementary browser;

providing said request for said first markup language document to a network application and receiving said first markup language document in said browser coordinator;

modifying said first markup language document by said browser coordinator by removing at least part of said reference to said second markup language document;

providing said modified first markup language document from said browser coordinator to said browser of the first modality; and providing said second markup language document front said browser coordinator to said complementary browser.

18. The machine-readable storage of claim 17, further comprising:

updating said synchronization table associated with said browser of the first modality according to said reference to said second markup language document.

19. The machine-readable storage of claim 18, wherein said updating step further comprises:

creating a new synchronization table including said reference to said second markup language document; and deleting said synchronization table.

20. The machine-readable storage of claim 17, further comprising:

providing said reference to said second markup language document to said browser of the second modality;

receiving a request for said second markup language document from said browser of the second modality;

providing said reference to said second markup language document to a network application;

receiving said second markup language document, wherein said second markup language document includes a second reference to another markup language document of the first modality; and modifying said second markup language document by removing at least part of said second reference.

21. The machine-readable storage of claim 20, further comprising:

updating a second synchronization table associated with said browser of the second modality according to said second reference.

22. The machine-readable storage of claim 21, wherein said updating step comprises:

creating a new second synchronization table including said second reference; and deleting said second synchronization table.

* * * * *